(12) United States Patent
Ostrom et al.

(10) Patent No.: US 10,938,718 B2
(45) Date of Patent: Mar. 2, 2021

(54) DEVICES, METHODS, AND SYSTEMS FOR CENTRALIZED CONTROL OF IP ROUTING

(71) Applicants: Carl D. Ostrom, Nevada City, CA (US); Graeme M. Little, Nevada City, CA (US)

(72) Inventors: Carl D. Ostrom, Nevada City, CA (US); Graeme M. Little, Nevada City, CA (US)

( * ) Notice: Subject to any disclaimer, the term of this patent is extended or adjusted under 35 U.S.C. 154(b) by 0 days.

(21) Appl. No.: 14/046,390

(22) Filed: Oct. 4, 2013

(65) Prior Publication Data

US 2014/0140345 A1 May 22, 2014

Related U.S. Application Data

(60) Provisional application No. 61/710,305, filed on Oct. 5, 2012.

(51) Int. Cl.
*H04L 12/741* (2013.01)
*H04L 12/701* (2013.01)

(52) U.S. Cl.
CPC .............. *H04L 45/74* (2013.01); *H04L 45/00* (2013.01)

(58) Field of Classification Search
CPC ...... H04L 45/00; H04L 45/74; H04L 29/0653
See application file for complete search history.

(56) References Cited

U.S. PATENT DOCUMENTS

| | | | | |
|---|---|---|---|---|
| 2002/0141401 | A1* | 10/2002 | Albert | H04L 12/4633 370/389 |
| 2005/0198282 | A1 | 9/2005 | Stahl et al. | |
| 2008/0285560 | A1 | 11/2008 | Curtis et al. | |
| 2012/0287791 | A1* | 11/2012 | Xi | H04L 43/0882 370/237 |
| 2013/0266018 | A1* | 10/2013 | Ashida | H04L 49/3009 370/392 |
| 2016/0057050 | A1 | 2/2016 | Ostrom et al. | |

* cited by examiner

*Primary Examiner* — Kent Krueger
(74) *Attorney, Agent, or Firm* — Stamoulis & Weinblatt LLC

(57) ABSTRACT

Devices, methods, and systems are described for the execution of centralized control of IP routing. The described methods may be used for video production systems. The methods may also be configured for other applications or in any IP routing environment to provide centralized routing control of any IP traffic.

32 Claims, 8 Drawing Sheets

Traditional Broadcast System Block Diagram

Traditional Broadcast System
IP Block Diagram

Packet Header Modification Block Diagram

Table Change Process Block Diagram

Source Oriented Signal Flow Chart

Destination Oriented Signal Flow Chart

Table Modification Control Flow Chart

DEVICES, METHODS, AND SYSTEMS FOR CENTRALIZED CONTROL OF IP ROUTING

The present invention claims priority to U.S. Patent Application No. 61/710,305 filed on Oct. 5, 2012 and is incorporated in its entirety.

BACKGROUND OF THE INVENTION

1. Field of the Invention

The present invention relates methods, systems, and devices for centralized control of Internet Protocol (IP) routing.

2. Background

Video production systems may employ multiple sources of media content. In large scale systems, there may be hundreds of media sources that need to be managed and controlled. Work flow processes may be used to determine what media content from these sources should be made available to specific processing, distribution, or monitoring devices. A centralized signal router may be used to route serial data streams between sources and destinations. The control system may conduct signal routing by communicating with a router.

Video production systems using an IP infrastructure may include an IP router. One drawback with an IP router is that it does not dynamically route signals based on control commands from external control systems. For unicast IP streams, the signal routing may be performed by reading the desired destination embedded in the IP signal itself. This means that the signal destination may be defined at the source of the signal. To change the destination of the source stream, the new destination needs to be communicated to the signal source and added to the original signal. The control system thus needs to be able to communicate with every source in the system, which is inefficient, burdensome, and not practical for large scale systems.

Each source may also deliver a multicast signal to the network. A destination may then join a source. In this case, the control system needs to be able to communicate with every destination device in order to notify each destination which source it is to join. Such systems increase network traffic, are costly, and are not practical to implement in large networks. Additionally, control execution, route status, stream transition timing, path assignment permission, and route conflict avoidance parameters are difficult to manage and accurately control in such systems.

A need thus exists to execute IP routing in a more efficient way that is easier to manage and control.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

SUMMARY

Figure 1:
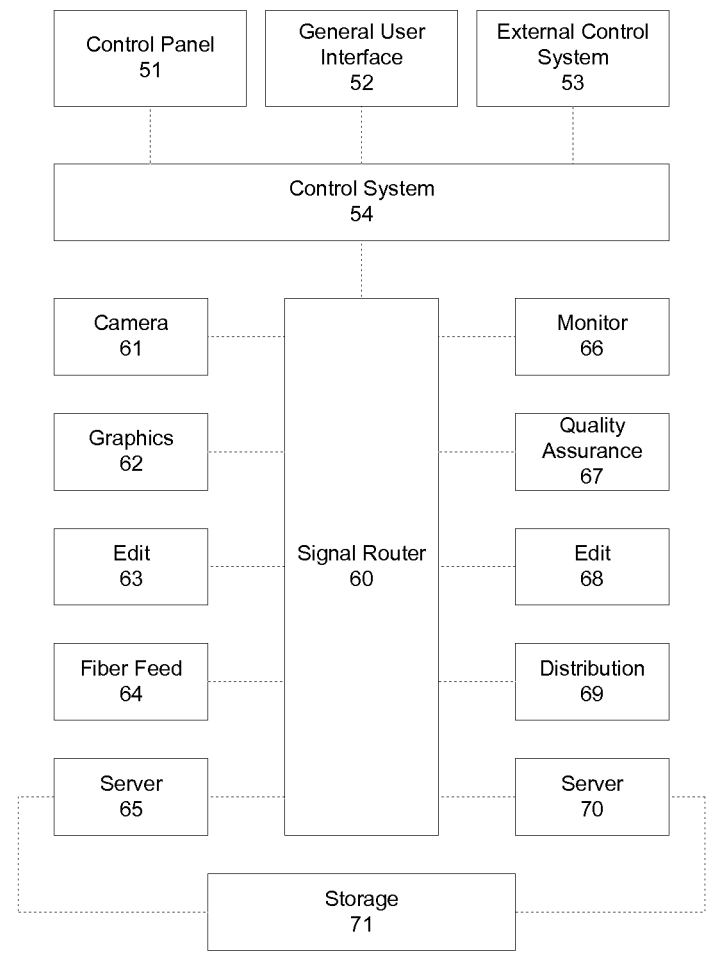
FIG. 1 illustrates a broadcast system in an embodiment.

In one aspect, there is described a method for routing data in an Internet Protocol (IP)-based network that includes providing a Packet Header Modification (PHM) device; receiving address information from at least one input stream from at least one an IP router and a network source device; and modifying the address information to reroute the at least one input streams.

The method further includes providing the at least one input stream to the PHM device, and providing the at least one input stream to the PHM using a destination address in the input stream. The method may also include using source address of the at least one input stream to define the source of the stream or using a destination address of the at least one input stream to define the source of the stream. The routing the at least one input stream based at least in part on a table of the IP router, and at least one input stream is one of a unicast or multicast stream.

In another aspect, there is described a computer program product, stored on a non-transitory computer readable medium, comprising instructions that, when executed on one or more computers, cause the one or more computers to perform operations to route data in an Internet Protocol (IP)-based network, providing a Packet Header Modification (PHM) device; receiving address information from at least one input stream from at least one an IP router and a network source device; and modifying the address information to reroute the at least one input streams.

DETAILED DESCRIPTION

Each of the additional features and teachings disclosed below can be utilized separately or in conjunction with other features and teachings to provide a device, system, and/or method for providing centralized IP Routing. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings Devices, methods, and systems are described for the execution of centralized control of IP routing. The described methods may be used for video production systems. The methods may also be configured for other applications or in any IP routing environment to provide centralized routing control of any IP traffic.

A command from an external control device or system may command a device acting as an IP router to modify the destination address in an incoming IP stream to route that stream to a desired destination device. An IP stream may be resident in the device performing the packet header modification (PHM) in order to modify the IP headers. The source IP address in the IP stream header may be used to define the source, when one or more input streams are directly coupled to the PHM device.

Sources may be coupled to and may be fed to a PHM device over an IP network using one or more multiple routers. The destination address in the stream may route the stream through the PHM device. One or more PHM devices may be used. The destination address in the IP header may be used to define the PHM device as the destination. In one embodiment, this may be accomplished by using one destination address for one or more sources and using the stream source address to define the source of the stream. In another embodiment, a different destination address for each source may be used. In another embodiment, a unique destination address may be used to define the source IP stream. Accordingly, the PHM device may be configured to act as the destination for multiple IP addresses.

The devices, methods, and systems may be configured to support either unicast or multicast IP streams. In one embodiment, the Multicast Group Address may be configured as the destination address. It should be noted that either the source or destination address may be used in the IP stream header to define the source stream. It should also be noted in the following examples the use of the destination address in the source stream to define the source stream is described.

The described methods may be performed in an IP router. In one configuration, the methods may be performed prior to an actual route function in the router such that the new destination in the stream may be routed using an existing Address Resolution Protocol (ARP), MRoute, or Network Address Translation (NAT) or similar technology table in the router.

The described methods may also be configured for an application specific dedicated address replacement device. In this configuration, one or more forwarding tables may be in the device providing the forwarding Media Access Control (MAC) addresses for each subscribing destination (unicast or multicast) with an IP header insertion function for the forwarding addresses.

FIG. 1 illustrates a video production system including one or more sources. The sources may include video cameras 61, graphics computers 62, edit systems 63, playout servers 65, network feeds 64, and other suitable sources for sourcing media content. Any number of sources may be included in the video production system.

A control system 54 may be configured to respond to one or more work flow processes which manage, schedule, define, and/or control what media content from the sources may be available to specific processing, such as edit and server 68 and 70, distribution 69, or monitoring and quality assurance 66 and 67. These work flow processes may be initiated by control panels 51, graphic user interfaces 52, or external control system interfaces 53, The control system 54 may instruct the distribution devices to route selected sources 61-65 to selected specific designations 66-70, as needed. Such control may be initiated via manual control panels 51, computer General User Interface (GUI) surfaces 52, or through an external control system 53, such as a computer based automation system generating route requests defined in a time based execution schedule.

A centralized signal router 60 may route serial data streams between selected sources 61-65 and selected destinations 66-70. The control system 54 may be configured to conduct signal routing by communicating with the signal router 60. Communication between the control system 54 and the signal router 60 enables accurate signal transition timing, route status, path assignment permission, and/or management of route conflict avoidance parameters.

Figure 2:
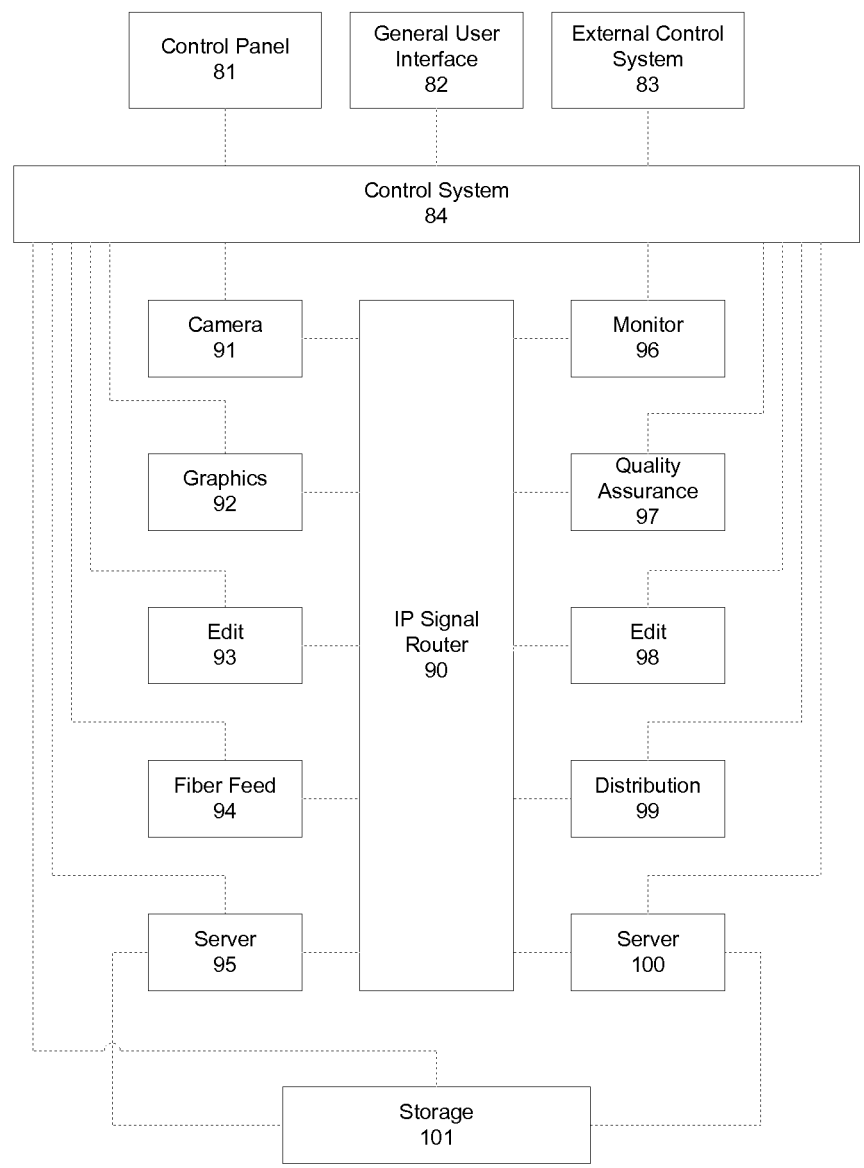
FIG. 2 illustrates an IP broadcast system in an embodiment.

FIG. 2 illustrates a video production system including an IP infrastructure having an IP router 90. In this configuration, the IP router 90 may route signals using unicast or multicast. For unicast IP streams the signal routing may be accomplished by reading the desired destination embedded in an IP signal. In one embodiment, the signal destination may be defined at the signal source. To change the destination of the source stream, the new destination may be communicated to the signal source in order to add a new destination to the original signal. In one embodiment, the control system may be configured to communicate with one or more sources.

A source may deliver a multicast signal to the network and let a destination define the source to join. The control system may be configured to communicate with one or more destination devices to communicate to the destination which source it is to join.

Figure 3:
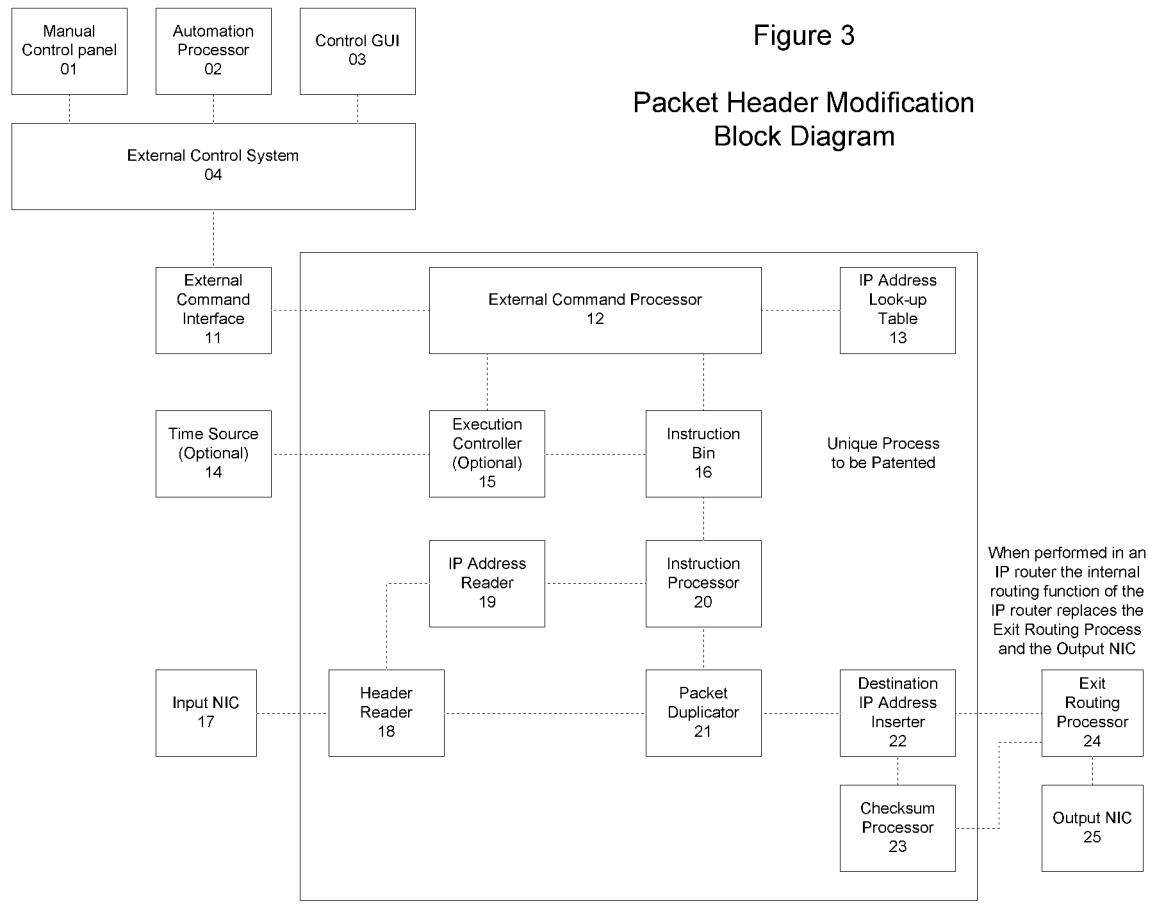
FIG. 3 illustrates a system for packet header modification in an embodiment.
Figure 4:
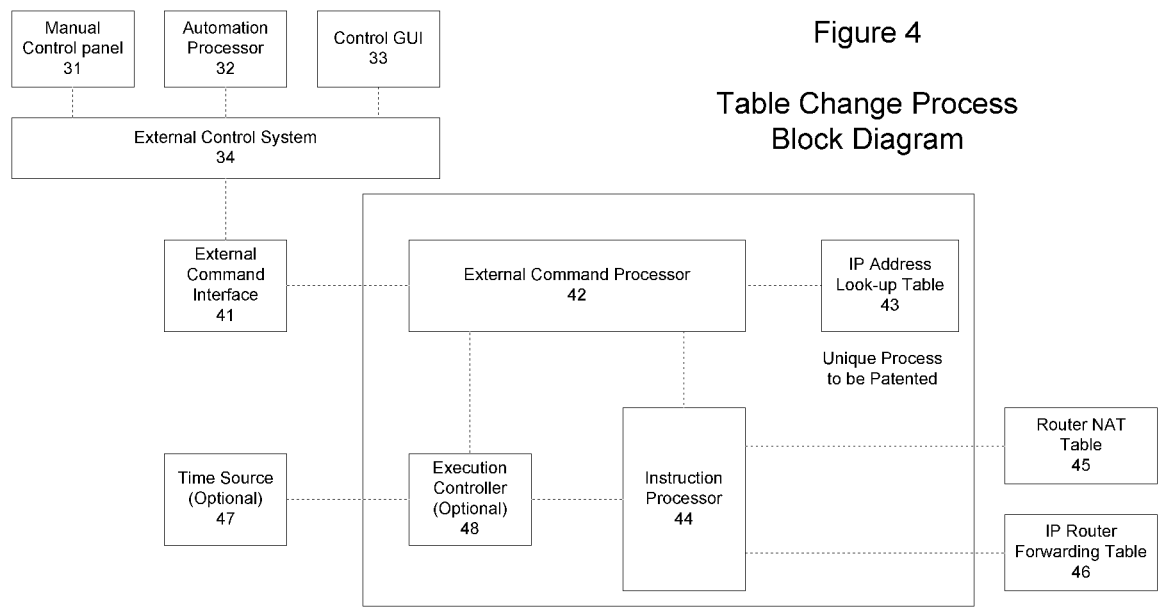
FIG. 4 illustrates a system for a table change process in an embodiment.

FIG. 3 illustrates a system for the centralized control of IP traffic. An external command interface 11 may be configured to receive a command string from an external control system 04. This command may be initiated from a manual control panel 1, an automation computer 2, or a GUI surface 3. Other suitable devices or a combination of devices for initiating a command may be used. The external control system 4 may read command requests and create a command data stream that contains data to define a specific routing instruction request. The command string including a routing request may also be received by the external command interface 11. The command string may define the source and destination data in a native nomenclature of the external control system. The command string may also include the IP addresses of either the source or destination.

Referring again to FIG. 3, the external command interface 11 may interpret a request by parsing the data in the command string and defining data in the string to send to an external command processor 12. The data may include an input source of packets to be routed to a new destination, a new destination to where packets are to be sent, a new route or an addition or replacement to an existing route, and a time for an instruction to take effect.

In one embodiment, the external command processor may organize the data for managing the routing instructions with source oriented control and/or destination oriented control. Other route management methods may also be used. In addition, the methods, devices, and systems may be used in a variety of networks using packet header addresses and/or routing methods.

Figure 5:
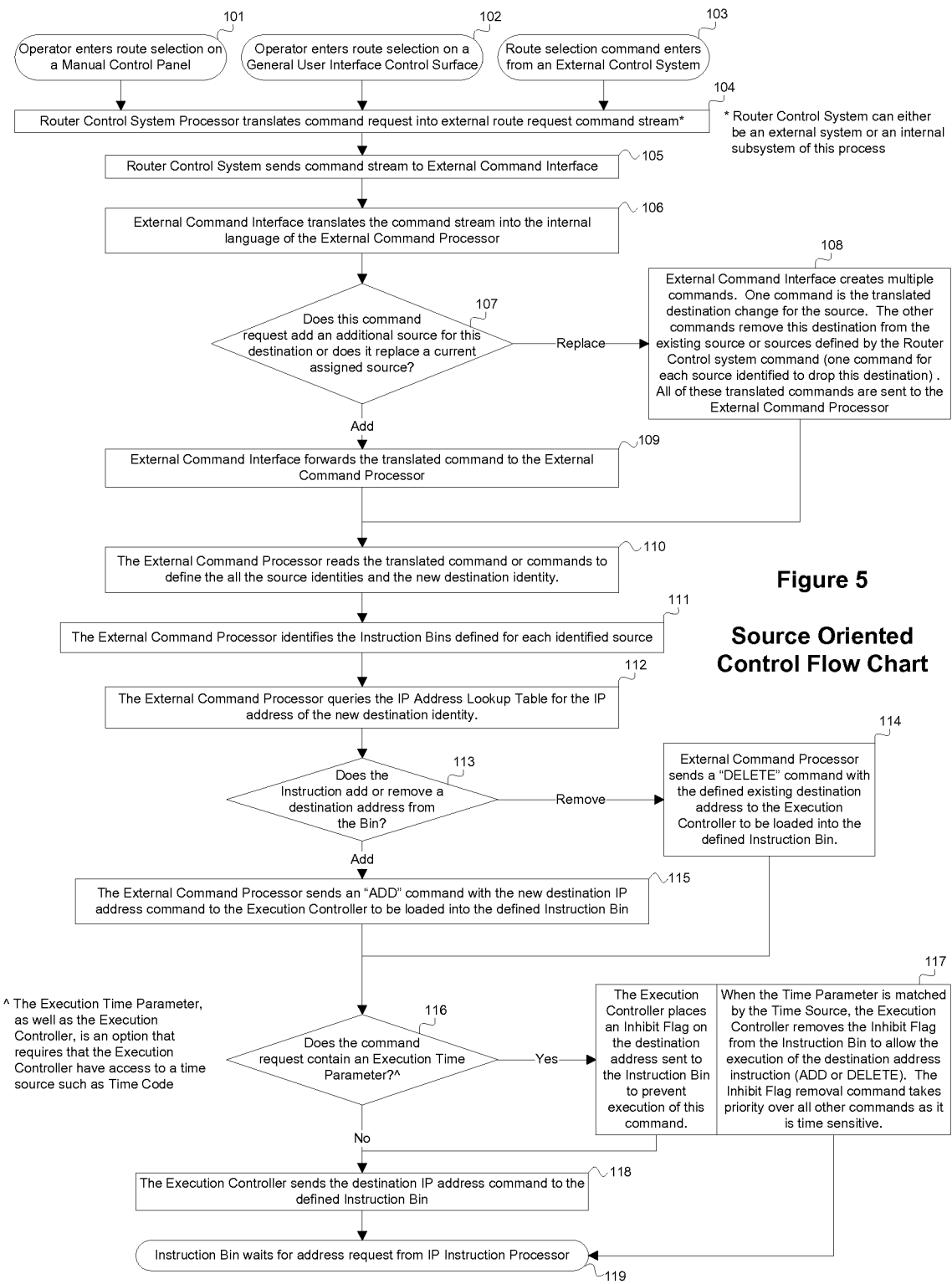
FIG. 5 illustrates a source oriented process in an embodiment.

FIG. 5 illustrates a process flow for a method of source oriented control in one embodiment. Source oriented routing may organize the routing instructions based on the incoming source data stream. In this method, each source data stream may have an associated or assigned instruction stack or instruction bin 16. In one embodiment, the destinations to which a stream is to be sent are listed in the instruction bin for that source stream.

Referring again to FIG. 3, the external command processor 12 may query the IP address lookup table 13 for the IP address of the source and destination defined in the command request. The IP address lookup table 13 may include the IP addresses defined for sources and destinations in the system. In this example, the source IP address may be defined as the destination IP address (multicast or unicast) in the packet header from the source to be modified. In other embodiments, the source IP address may be the actual source IP address in the incoming IP stream header. It should be noted that the source IP address may not be defined in the IP address lookup table. In some embodiments, a table using an internal nomenclature to define the instruction bin 16 location for each source may be used.

The external command interface receives a command string from an external control system at step 104. As shown, this command may be initiated from either a manual control panel (step 101), an automation computer (step 102), or a GUI control surface (step 103). At step 104, the external control system reads the command requests and creates a command data stream that contains the data to define a specific routing instruction request. The command string may be received by the external command interface at step 105. The command string may define the source and destination data in the native nomenclature of the external control system and may include the IP addresses of either the source or destination. At step 106, the external command interface interprets the request for the external command processor.

In one embodiment, one instruction bin may be defined for a given source found in the IP address lookup table 13. The external command processor may define whether the route command requests an additional route or replaces an existing route at step 107. If the command requests a replacement, the external command processor may define whether one or more existing destinations for this source should be removed or if the new destination is to be removed from one or more sources at step 108.

If the request is to add a new destination to the existing destinations for this source stream, the external command processor 12 may load an instruction command in the instruction bin 16 for the source defined in the original command at step 109. If a destination IP address exists in the bin 16, a new address is added to that list. The new destination IP address is the IP address to be loaded into the bin 16.

At step 108, if the request is to replace one or more existing destinations for the source stream, the external command processor 12 may create two instruction commands. First, a command may be created to add the new destination to the bin 16 and load this instruction command in the bin 16 for the source defined in the original command. In this configuration, the new destination IP address may be an IP address to be loaded into the instruction bin 16. A second command may also be created to delete the designated destination IP addresses defined to be replaced. This delete command may also be sent to the bin 16.

At step 110, the external command processor may read the translated command to define the source identities and the new destination identity. At step 111, the external command processor may identify the instruction bins defined for each identified source. At step 112, the external command processor may query the IP address look up table for the IP address of the new destination identity. At step 113, it is determined whether to add or remove an address from the instruction bin.

If the request is to add the new destination, at step 115, a command to add the new destination to the instruction bin 16 may be created and the instruction command may be loaded in the instruction bin 16 for the source defined in the original command. The new destination IP address may be the IP address to be loaded into the instruction bin 16. If the request is to remove the new destination for this source stream from one or more other source streams, the external command processor 12 may create a number of instruction commands. A number of additional commands may be created equal to the number of sources from which this destination is to be removed. These commands may be sent to the instruction bins defined for the sources from which this destination is to be removed. Each command may instruct the instruction bin to delete this destination IP address from its list of addresses at step 114.

If no addition or replacement designation is provided in the route request, the external command processor 12 may default to either just adding this destination to the source bin 16 or remove the new destination from all other sources than the one in the new route request. The choice of a default method may be a fixed process parameter or configurable.

A specific time for the new destination route to be executed may also be included in an embodiment. A time source 14 may be included or coupled to the system. In one embodiment, an execution controller 15 may be coupled to the time source 14. The execution controller may be configured as an execution policy manager. If the initial route request contains an execution time parameter at step 116, the execution controller may add an "Inhibit" flag on the destination IP address it sends to the bin 16 at step 117. The execution controller may then place a comparator function in an instruction stack where the time parameter value is compared with the time source value. As shown in steps 117-119, when the time source value matches the time parameter value, the execution controller 15 may remove the "Inhibit" flag for that destination in the instruction bin 16 and the new destination may become active in the insertion process discussed below.

Figure 6:
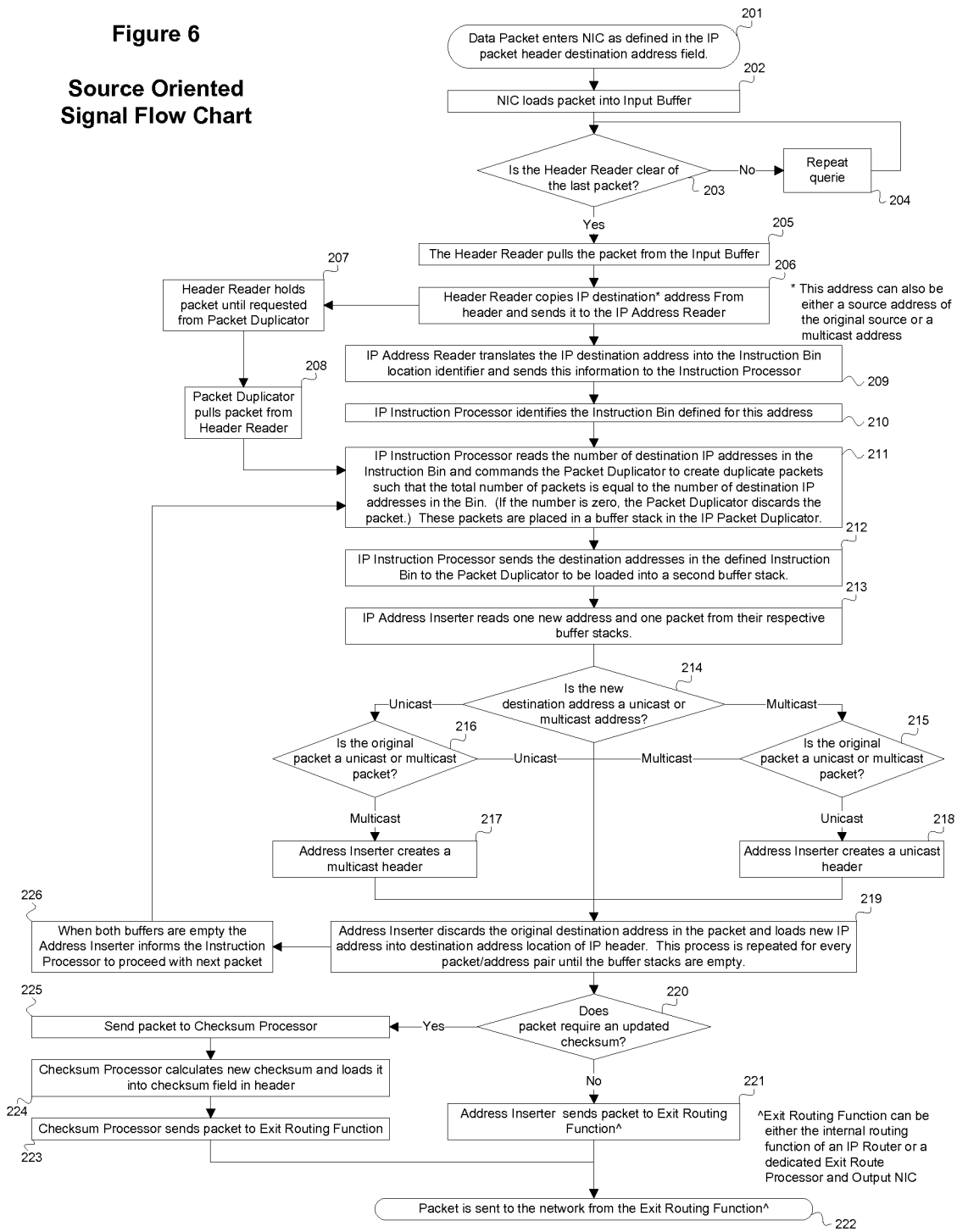
FIG. 6 illustrates a source oriented signal process in an embodiment.

FIG. 6 illustrates a process flow for a source oriented signal flow, which may be performed in a server, as a separate process, or within an IP router as part of the routing process.

An input network interface port, such as a network interface card, (NIC) 17 may receive packets from the network which contain destination IP addresses defined for this device at step 201. The destination IP address may be a unique destination address assigned to each source as a "subscription." The destination IP address may also be a single destination address for all incoming source streams, when the actual source IP address in the stream is used for the source stream identifier. For source stream identification, a corresponding entry for that source may be configured in an IP address lookup table 13 or an instruction bin 16 assignment table that identifies a unique instruction bin.

The packets received by the input NIC 17 may be stored in a buffer at step 202 and read out by a header reader 18, where the source identifying IP address of the packet is isolated. The header reader 18 may hold the packet until a "Send" command is received from a packet duplicator 21, as shown in steps 203-205 and 207 and 208. The destination IP address field of the incoming packet may be copied from the packet in the header reader 18 (step 206) and sent to the IP address reader 19. If the source address is used as the source identifier, both the source and destination address fields may be copied and sent to the IP address reader. The IP address reader may read the source identifying IP address, translate the IP address into the internal nomenclature that defines the bin for that source, and sends it to an instruction processor 20 at step 209. The instruction processor may identify the bin 16 defined for the source identifying IP address at step 210.

At step 211, the instruction processor may read the destination IP addresses in the bin and then send a command to the packet duplicator 21 to read the packet from the header reader 18 and duplicate the packet it receives to create a number of packets equal to the number of destination IP addresses in the bin 16.

In one method, the packet content may be separated from the packet address header as an isolated element for address processing. In another embodiment, the address portion of the packet may be embedded in the header of the complete packet.

At step 211, the instruction processor may send all of the destination addresses in the bin 16 to a buffer stack in the packet duplicator 21, which may duplicate the packet it has received from the header reader 18 until it has the number of packets defined by the instruction processor 20. The packet duplicator 21 may load these packets into a second buffer stack at step 212.

At step 213, the address inserter 22 may read the packets from one buffer stack and the destination addresses from the second buffer stack in the packet duplicator 21. The IP address inserter 22 may determine whether the original packet is a unicast or multicast packet.

It is determined at step 214 if destination address is unicast or multicast. As shown in steps 216 and 217, if the original packet is a unicast packet and the new address is a unicast destination address, the IP address inserter 22 removes the original destination address and places the new destination address in the packet. If the new address is a multicast address, the address inserter 22 modifies the packet header to become a multicast header and places the new multicast destination address in the packet header.

As shown in steps 215 and 218, if the original packet is a multicast packet and the new address is a multicast destination address, the IP address inserter 22 removes the original destination address and places the new destination address in the packet. If the new address is a unicast address, the address inserter 22 modifies the packet header to become a unicast header and places the new unicast destination address in the packet header.

Once the address inserter 22 has emptied both buffer stacks, it may inform the instruction processor 20 to begin the process for the next packet, as shown in steps 219 and 226. The address inserter 22 may also define if the packet is a UDP packet or other packet format that requires a port assignment or a new checksum for the new address.

If the packet is a UDP or other packet that uses a port assignment, the original UDP port is maintained, unless the IP address lookup table 13 defines a new port for the new address. If a new port is required, that port assignment may be part of the new destination IP address data loaded in the bin 16

If the packet does not require a new checksum at step 220, it is sent directly to the exit routing process, as shown in steps 221 and 222. If the packet requires a new checksum at step 220, it is sent to the checksum processor 23, which may calculate a new checksum for that packet and enter the corrected checksum into the checksum field of the packet header, as shown in steps 224 and 225. The checksum processor 23 may then send the packet to the exit routing process at step 223.

The above method may be executed in an IP router prior to the routers route processing, such that the route tables may execute the routing based on the new destination address. The MAC address fields may be unchanged and the exit routing process may be the IP router and its internal routing processes.

For a dedicated address replacement device, the MAC address of the next hop may be defined and performed in the exit routing processor 24. This can be done using either a fixed MAC insertion where the next hop is fixed for all destination addresses, with an internal ARP table, or other mechanism, that defines the MAC address and exit port for the next hop for the new destination address. The exit routing processor 24 may send the completed packet to the output NIC 25 and then over a network. The output NIC 25 may contain one or more exit ports.

Figure 7:
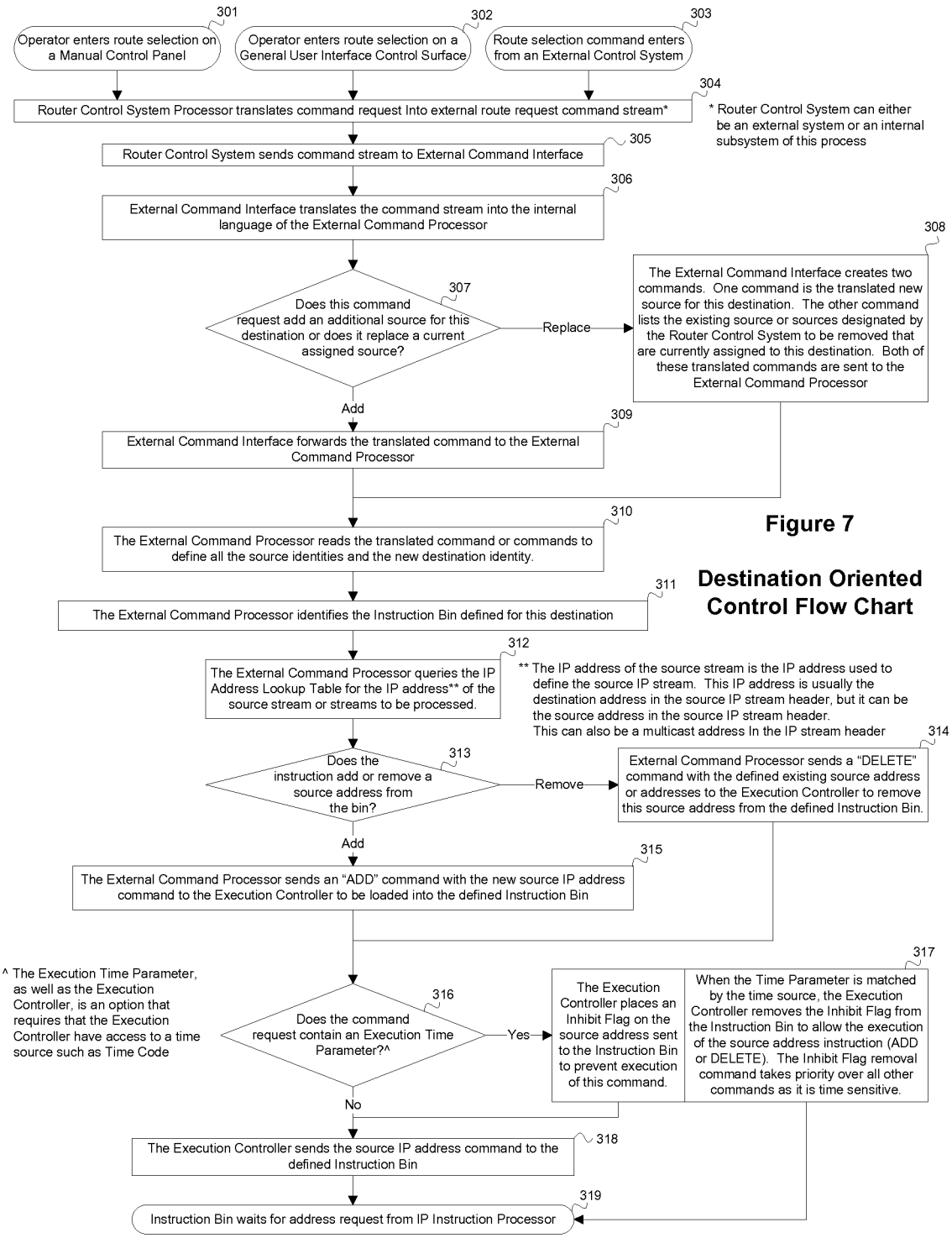
FIG. 7 illustrates a destination oriented process in an embodiment.

FIG. 7 illustrates a process flow for a destination oriented control method. Destination oriented routing organizes the routing instructions based on the outgoing destination data stream. In this method, each destination IP address may have a designated bin 16 assigned to it and all the sources that are to be sent to this destination may be listed in the bin 16 identified for that destination.

The external command processor 12 may query the IP address lookup table 13 for the IP address of the source and destination defined in the command request. The IP address lookup table 13 includes the IP addresses defined for sources and destinations in the system. The "source IP address" may be defined as the destination IP address (multicast or unicast) in the packet header from the source to be modified. The source IP address may also be the source IP address in the Incoming IP stream header.

The external command interface receives a command string from an external control system at step 304. As shown, this command may be initiated from either a manual control panel (step 301), an automation computer (step 302), or a GUI control surface (step 303). At step 304, the external control system reads the command requests and creates a command data stream that contains the data to define a specific routing instruction request. The command string may be received by the external command interface at step 305. The command string may define the source and destination data in the native nomenclature of the external control system and may include the IP addresses of either the source or destination. At step 306, the external command interface interprets the request for the external command processor.

In one embodiment, an instruction bin 16 may be defined for a destination defined in the IP address lookup table 13. The external command processor 12 may define whether the route command requests an additional route or replaces an existing route at step 307. If the command requests a replacement, the external command processor 12 defines whether one or more existing sources for this destination may be removed or if the new source is to be removed from one or more destinations.

If the request is to add a new source stream to the existing source streams for this destination at step 307, the external command processor 12 may load an instruction command with the new source address in the instruction bin 16 for the destination defined in the original command. If there are already source IP addresses in the instruction bin 16, the new address may be added to that list. The source IP address (or source stream designation nomenclature) may be the IP address loaded into the instruction bin 16.

If the request is to replace one or more existing sources streams for this destination at step 307, the external command processor 12 creates two instruction commands at step 308. It creates one command to add the new source to the instruction bin 16 and may load this instruction command in the instruction bin 16 for the destination defined in the original command. The source IP address (or source stream designation nomenclature) may be the IP address to be loaded into the instruction bin 16. A second command may be created to delete the designated source IP addresses defined to be replaced and may send this Delete command to the same instruction bin 16.

The external command interface may forward the translated command to the external command processor in step 309, if an addition is determined at step 307. At step 310, the external command processor may read the translated instruction commands that are either passed from step 309 (add only) or created in step 308 (add and remove) to define the source identities and the new destination identity. At step 311, the external command processor may identify the instruction bins defined for these instructions. At step 312, the external command processor may query the IP address look up table for the IP address of the source stream to be processed. At step 313, it is determined whether to add or remove an address from the instruction bin.

If the request is to remove the new source stream for this destination from one or more other destinations, the external command processor 12 may create a number of instruction commands at step 314. Of these commands, the processor 12 may send one command to add the new source to the instruction bin 16 and may load this instruction command in the bin 16 for the destination defined in the original command. The source IP address (or source stream designation nomenclature) may be the IP address to be loaded into the bin 16. A number of additional commands may also be sent equal to the number of destinations from which this source stream is to be removed to delete the designated source IP addresses defined for the new route from the bins 16 defined for the destinations from which this source is to be removed. The external command processor 12 may send the Delete commands to the specific instruction bin 16 corresponding to the destination from which this source stream is to be removed.

If no addition or replacement designation is provided in the route request, the external command processor 12 may default at step 315 to either only adding the new source to the instruction bin 16 or adding the new destination to the instruction bin 16 and also removing the existing sources from the instruction bin 16 for the defined destination. The choice of default method may be either a fixed process parameter or configurable.

A specific time may be defined for the new source stream route to be executed. In one embodiment, a time source 14 and execution controller 15 may be connected or coupled to the system, as described above.

If the initial route request contains an execution time parameter at step 316, the execution controller 15 may add an "Inhibit" flag on the source IP address sent to the instruction bin 16 at step 317. It then places a comparator function in an instruction stack where the time parameter value is compared with the time source 14 value. When the time source 14 value matches the time parameter value, the execution controller 15 may remove the "Inhibit" flag for that source in the instruction bin 16 and the new source may become active in the insertion process discussed herein and shown in steps 318 and 319.

Figure 8:
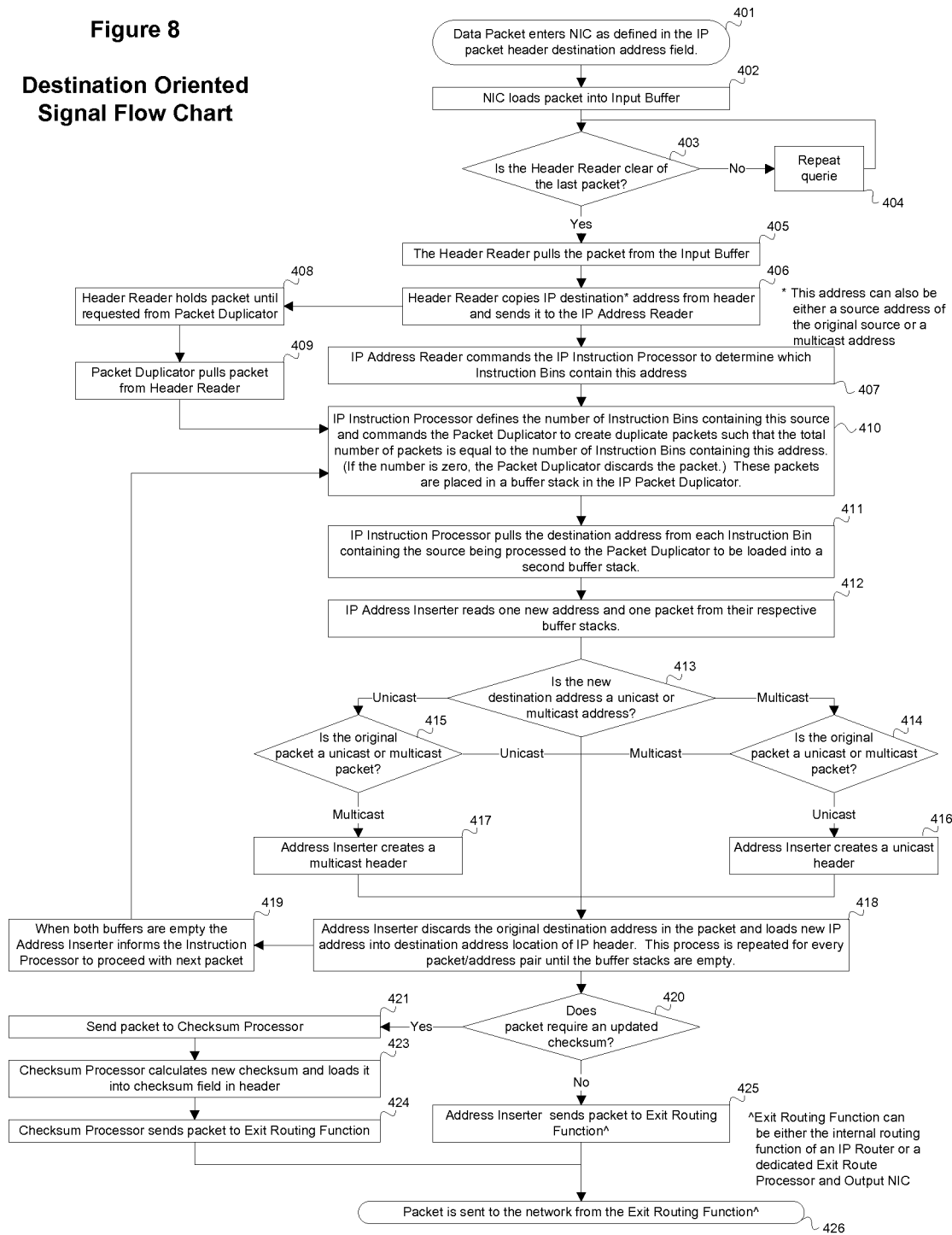
FIG. 8 illustrates a destination oriented signal process in an embodiment.
Figure 9:
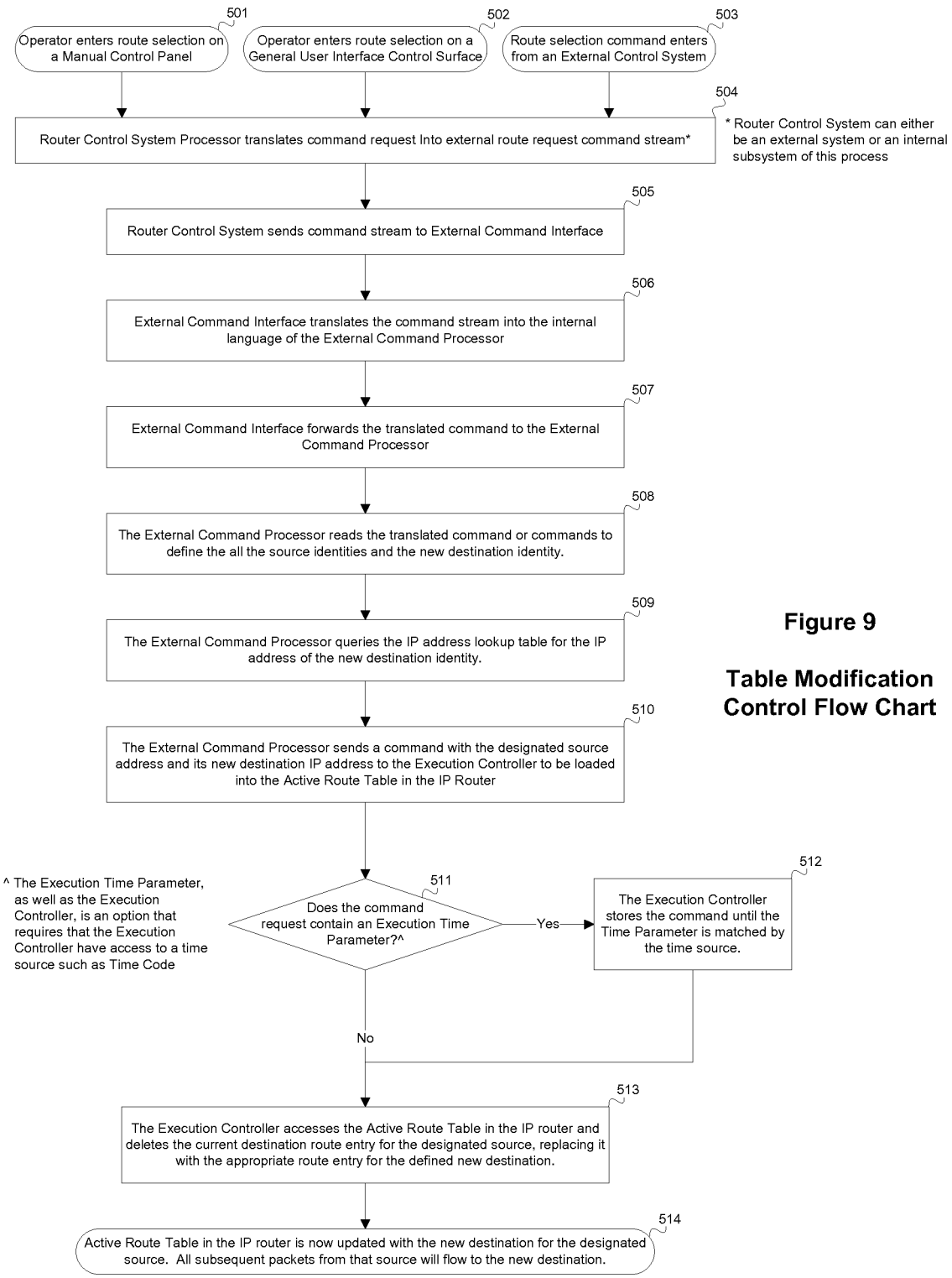
FIG. 9 illustrates a table modification control process in an embodiment.

FIG. 8 illustrates a process flow for the destination oriented signal flow. The process may be performed in either a server, as a separate process, or within an IP router as part of the routing process The input NIC 17 receives packets from the network containing destination IP addresses at step 401. This may be a unique destination address assigned to each source as a "subscription." This may also be a single destination address for all source streams if the actual source IP address in the stream is used for the source stream identifier. A corresponding entry for that source in the IP address lookup table 13 may be included that identifies each source stream as a unique signal. The IP address lookup table 13 may also contain all the destination IP addresses of the destination locations on the network subscribed to this process. Each of these destination IP addresses corresponds to a unique instruction bin 16.

The packets received by the input NIC 17 may be stored in a buffer at step 402 and read out by the header reader 18 where the source identifying IP address of the packet is isolated. As shown in steps 403-405 and 408 and 409, the header reader 18 may hold the packet until a "Send" command is received from the packet duplicator 21. The destination IP address (or the source address, if that is defined as the source identifying IP address) in the incoming packet may be copied and sent to the IP address reader 19 at step 406.

The IP address reader 19 may read the source identifying IP address and send it to the instruction processor 20, which may query the instruction bins 16 to determine if this source is requested for any destination in step 407. If it finds no entries for this source stream in any instruction bin 16, it sends a "0" command to the packet duplicator 16 where the packet is deleted. If the instruction processor 20 finds one or more instruction bins 16 containing the source, it loads the corresponding destination IP address for each instruction bin 16 into a buffer stack in the packet duplicator 21 and commands the packet duplicator 21 to create a number of copies of the original packet equal to the number of instructions bins 16 containing an entry for this source stream.

The packet duplicator 21 may duplicate the packet it has received from the header reader 18 until it has the number of packets defined by the instruction processor 20 at step 410. The packet duplicator 21 may load these packets into a second buffer stack at step 411.

Once the packet duplicator 21 loads the new packets into the instruction stack, it may send a "Send" command to the header reader 18 to forward the next packet.

The address inserter 22 reads the packets from one buffer stack and the destination addresses from the second buffer stack in the packet duplicator 21 at step 412. The IP address inserter 22 determines whether the original packet is a unicast or multicast packet at step 413.

As shown in steps 415 and 417, if the original packet is a unicast packet and the new address is a unicast destination address, the IP address inserter 22 removes the original destination address and places the new destination address in the packet. If the new address is a multicast address, the address inserter 22 modifies the packet header to become a multicast header and places the new multicast destination address in the packet header.

As shown in steps 414 and 416, if the original packet is a multicast packet and the new address is a multicast destination address, the IP address inserter 22 removes the original destination address and places the new destination address in the packet. If the new address is a unicast address, the address inserter 22 modifies the packet header to become a unicast header and places the new unicast destination address in the packet header.

Once the address inserter 22 has emptied both buffer stacks, it may inform the instruction processor 20 to begin the process for the next packet, as shown in steps 418 and 419. The address inserter 22 may also define if the packet is a UDP packet or other packet format that requires a port assignment or a new checksum for the new address.

If the packet is a UDP or other packet that uses a port assignment, the original UDP port is maintained, unless the IP address lookup table 13 defines a new port for the new address. If a new port is required, that port assignment may be part of the new destination IP address data loaded in the bin 16

If the packet does not require a new checksum at step 420, it is sent directly to the exit routing process, as shown in steps 425 and 426. If the packet requires a new checksum at step 420, it is sent to the checksum processor 23, which may calculate a new checksum for that packet and enter the corrected checksum into the checksum field of the packet header, as shown in steps 424 and 423. The checksum processor 23 may then send the packet to the exit routing process at step 424.

The above method may be executed in an IP router prior to the routers route processing, such that the route tables may execute the routing based on the new destination address. The MAC address fields may be unchanged and the exit routing process may be the IP router and its internal routing processes.

If this process is executed as a dedicated address replacement device the MAC address of the next hop may be defined and performed in the exit routing processor 24. This can be done using either a fixed MAC insertion where the next hop is fixed for all destination addresses, with an internal ARP table, or any other mechanism that defines the MAC address and exit port for the next hop for the new destination address. The exit routing processor 24 may send the completed packet to the output NIC 25 and then over a network. The output NIC 25 may contain one or more exit ports.

The source oriented and destination oriented control methods describe the route assignment data to be held in a number of instruction bins 16. In other embodiments, a table may be configured to perform route assignments including the same data as the instruction bins 16. In one embodiment, the table may be able to accommodate a dynamic assignment of multiple routes for each flow.

In one embodiment, existing routing tables in traditional IP routers or layer 2 switches may be altered to dynamically route packet streams within a network. That method is covered under this patent and is described below. In another embodiment, the above methods may be performed using existing translation tables inside an IP router or firewall.

Forwarding tables may define the next hop versus the final destination of the packet. Accordingly, address translation tables, such as NAT, PAT, etc., may be required. In one embodiment, a router may be used where all sources and destinations are directly connected or coupled to its ports. In such a configuration, standard ARP, MRoute, and other forwarding tables may be used, and the methods may be executed at either Layer 2 switching or Layer 3 routing.

An external control interface may be used to modify the route instruction entries in the tables. External route instruction commands may include input source of packets to be routed to a new destination, new destination to where packets are to be sent, or time for the instruction to take effect. The translated command is sent to the external command processor at step 508.

At step 509, the external command processor 42 queries the IP address lookup table 43 for the IP address of the source and destination defined in the command request. The IP address lookup table may include the IP addresses for sources and destinations defined in the system. In one embodiment, the "source IP Address" may be defined as the destination IP Address in the packets from the source to be modified.

At step 510, the external command processor may send an instruction command to the instruction processor 44 for the source defined in the original command, which may send a command to either a NAT or forwarding table in the IP router to change the translation address or forwarding address for the defined source IP address in the table.

For a NAT Exlate table, the policy manager for the NAT may be dynamically configured and controlled from external commands in real time The address change may be accommodated in the existing IP router tables of the IP router. A specific time for the new source stream route to be executed may also be defined. A time source 47 may be coupled or connected to the system along with an execution controller 48 acting as a policy manager.

If the initial route request does not contain a time parameter at step 511, the process proceeds to step 512. If the initial route request contains an execution time parameter at step 511, the execution controller 48 may hold the destination IP address from the external command processor before reaching the instruction processor 45. It then places a comparator function in an instruction stack where the time parameter value is compared with the time source value. As shown in steps 512-514, when the time source value matches the time parameter value, the execution controller forwards the new destination address to the active route table and the new destination becomes the active route defined in the internal IP router table.

In other embodiments, the processing modules may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

It should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A method for automatically routing data in an Internet Protocol (IP)-based network, comprising:
receiving at least one destination reroute request command string from at least one of an external manual control interface, external control device, and external system for at least one packetized stream, the reroute request command string including one or more new destination reroute requests;
executing the one or more new destination reroute requests, such that at least one of packetized stream may be rerouted to one or more new destinations by receiving the at least one packetized stream from at least one network source device in a Packet Header Modification (PHM) device, automatically inserting a designated one of the new destinations from the reroute request command string in one or more packet headers of the at least one packetized data stream; wherein an address reader identifies the destination address of the at least one packetized stream and an address inserter identifies that the one of the new destinations is a unicast or multicast address that is different than that found by an address reader in the one or more headers of the at least one packetized stream;
wherein if the at least one packetized stream includes a first unicast address or first multicast address identified in the address reader, and the one or more new destinations is a unicast address or multicast address, in the address inserter replacing the first unicast address with the unicast address or replacing the first multicast address with the multicast address;
wherein if the at least one packetized stream includes the first unicast address identified in the address reader, and the one or more new destinations is the multicast address in the address inserter, modifying the one or more packet headers and replacing the first unicast address with the multicast address;
and
wherein if the at least one packetized stream includes the first multicast address identified in the address reader, and the one or more new destinations is the unicast address in the address inserter, modifying the one or more packet headers and replacing the first multicast address with the unicast address and forwarding the at least one packetized stream to the one or more designated new destinations.

2. The method of claim 1 further comprising wherein the at least one packetized stream comprises at least one IP stream.

3. The method of claim 1 wherein the PHM is an integrated function of a layer 2 IP switch, layer 3 IP router, or network server through a interface card (NIC).

4. The method of claim 1 wherein the at least one packetized stream is directly coupled to a dedicated PHM device.

5. The method of claim 1 further comprising automatically routing the at least packetized stream based at least in part on modifying a table of an IP routing or switching device.

6. The method of claim 1, further comprising organizing and managing route instructions to allow for an addition of the one or more new destinations or a deletion of the one or more destinations for the at least one packetized stream.

7. The method of claim 1 further comprising automatically associating an instruction bin with the at least one packetized stream, the bin being configured to at least one of add and delete one of a destination and a source.

8. The method of claim 1 further comprising automatically employing source-oriented control to route the at least one packetized stream.

9. The method of claim 1 further comprising automatically employing destination-oriented control to route the at least one packetized stream.

10. The method of claim 1, wherein the at least one packetized stream is a unicast input stream with an associated source and the method further comprising automatically transmitting the unicast input stream to one or more of the new destinations, each with a designated new unique unicast or multicast group destination.

11. The method of claim 1, wherein the at least one packetized stream is a multicast input stream with an associated source and the method further comprising automatically transmitting the multicast input stream to one or more of the new destinations, each with a designated new unique unicast or multicast group destination.

12. The method of claim 1 wherein the at least one packetized stream is a unicast input stream with an associated destination and the method further comprising automatically transmitting the unicast input stream to one or more of the new destinations, each with a designated new unique unicast or multicast group destination.

13. The method of claim 1 wherein the at least one packetized stream is a multicast input stream with an associated destination and the method further comprising automatically transmitting the multicast input stream to one or more of the new destinations, each with a designated new unique unicast or multicast group destination.

14. The method of claim 1 wherein the destination reroute request command string contains an execution time parameter defining a time element for packet reroute request execution.

15. The method of claim 1 wherein the at least one of an external manual control interface, external control device, and external control system includes at least one of a manual control panel, an automation computer, and a GUI surface for initiating a packet reroute request command.

16. The method of claim 15 wherein the at least one of an external manual control interface, external control device, and external control system includes at least one of a manual control panel, an automation computer, and a GUI surface for initiating a packet reroute request command being at least one of a separate system or combined as parts of at least one of a larger integrated system.

17. A computer program product, stored on a non-transitory computer readable medium, comprising instructions that, when executed on one or more computers, cause the one or more computers to perform operations to route data in an Internet Protocol (IP)-based network, comprising:

receiving at least one destination reroute request command string from at least one of an external manual control interface, external control device, and external system for at least one packetized stream, the reroute request command string including one or more new destination reroute request;

executing the one or more new destination reroute requests, such that at least one of packetized streams may be rerouted to one or more new destinations by receiving the at least one packetized stream from at least one network source device in a Packet Header Modification (PHM) device, automatically inserting a designated one of the new destinations in one or more packet headers of the at least one packetized data stream;

wherein an address reader identifies the destination address of the at least one packetized stream and an address inserter identifies that the one of the new destinations is a unicast or multicast address that is different than that found by an address reader in the one or more headers of the at least one packetized stream;

wherein if the at least one packetized stream includes a first unicast address or first multicast address identified in the address reader, and the one or more new destinations is a unicast address or multicast address, in the address inserter replacing the first unicast address with the unicast address or replacing the first multicast address with the multicast address;

wherein if the at least one packetized stream includes the first unicast address identified in the address reader, and the one or more new destinations is the multicast address in the address inserter, modifying the one or more packet headers and replacing the first unicast address with the multicast address;

and wherein if the at least one packetized stream includes the first multicast address identified in the address reader, and the one or more new destinations is the unicast address in the address inserter, modifying the one or more packet headers and replacing the first multicast address with the unicast address and forwarding the at least one packetized stream to the one or more designated new destinations.

18. The computer program product of claim 17 wherein the destination reroute request command string contains an execution time parameter defining a time element for packet reroute request execution.

19. The computer program product of claim 17 further comprising wherein the at least one packetized streams comprise at least one IP stream.

20. The computer program product of claim 17 wherein the PHM is an integrated function of a layer 2 IP switch, layer 3 IP router, or network server through a interface card (NIC).

21. The computer program product of claim 17 wherein the at least one packetized stream is directly coupled to a dedicated PHM device.

22. The computer program product of claim 17 further comprising automatically routing the at least one packetized stream based at least in part on modifying a table of an IP routing or switching device.

23. The computer program product of claim 17, further comprising organizing and managing route instructions to allow for an addition of the one or more new destinations or a deletion of the one or more destinations for the at least one packetized stream.

24. The computer program product of claim 17 further comprising automatically associating an instruction bin with the at least one packetized stream, the bin being configured to at least one of add and delete one of a destination and a source.

25. The computer program product of claim 17 further comprising automatically employing source-oriented control to route the at least one packetized stream.

26. The computer program product of claim 17 further comprising automatically employing destination-oriented control to route the at least packetized stream.

27. The computer program product of claim 17 wherein the at least one of an external manual control interface, external control device, and external control system includes at least one of a manual control panel, an automation computer, and a GUI surface for initiating a packet reroute request command.

28. The computer program product of claim 17 wherein the at least one of an external manual control interface, external control device, and external control system includes at least one of a manual control panel, an automation computer, and a GUI surface for initiating a packet reroute request command being at least one of a separate system or combined as parts of at least one of a larger integrated system.

29. The computer program product of claim 17 wherein the at least one packetized stream is a unicast input stream with an associated source and further comprising automatically transmitting the unicast input streams to one or more of new destinations, each with a designated new unique unicast or multicast group destination.

30. The computer program product of claim 17 wherein the at least one packetized stream is a multicast input stream with an associated source and further comprising automatically transmitting the multicast input stream to one or more of the new destinations, each with a designated new unique unicast or multicast group destination.

31. The computer program product of claim 17 wherein the at least one packetized stream is a unicast input stream with an associated destination and further comprising automatically transmitting the unicast input stream to one or more of the new destinations, each with a designated new unique unicast or multicast group destination.

32. The computer program product of claim 17 wherein the at least one packetized stream is a multicast input stream with an associated destination and further comprising automatically transmitting the multicast input stream to one or more of the new destinations, each with a designated new unique unicast or multicast group destination.

* * * * *